United States Patent [19]
Barton et al.

[11] Patent Number: 5,842,226
[45] Date of Patent: *Nov. 24, 1998

[54] VIRTUAL MEMORY MANAGEMENT FOR A MICROKERNEL SYSTEM WITH MULTIPLE OPERATING SYSTEMS

[75] Inventors: Gary Lee Barton; Ching-Yun Chao; Charles Chuldoo Jung; Freeman Leigh Rawson, III; Hardeep Singh, all of Boca Raton; Guy Gil Sotomayor, Jr., West Palm Beach, all of Fla.

[73] Assignee: International Business Machines Corporation, Armonk, N.Y.

[ * ] Notice: The terminal 8 months of this patent has been disclaimed.

[21] Appl. No.: 303,851

[22] Filed: Sep. 9, 1994

[51] Int. Cl.$^6$ .................................................. G06F 12/08
[52] U.S. Cl. ............................................ 711/203; 711/153
[58] Field of Search .................................... 395/650, 600, 395/700, 413, 419, 480, 406, 621, 622

[56] References Cited

U.S. PATENT DOCUMENTS

| | | | |
|---|---|---|---|
| 4,742,447 | 5/1988 | Duvall et al. | 395/406 |
| 5,125,086 | 6/1992 | Perazzoli, Jr. | 395/486 |
| 5,392,415 | 2/1995 | Badovinatz et al. | 395/406 |
| 5,517,643 | 5/1996 | Davy | 395/650 |
| 5,561,785 | 10/1996 | Blandy et al. | 395/497.01 |

FOREIGN PATENT DOCUMENTS

0107449 B1  12/1989  European Pat. Off. .......... G06F 9/44

OTHER PUBLICATIONS

David L. Cohn et al., "Basing Micro–Kernel Abstractions on High–Level Language Models", Open Forum '92, The Pan–European Open Systems Event, Proceedings of the Technical Conference, Utrecht, 23–27 Nov., 1992.

Gerald Malan, et al., "DOS as a Mach 3.0 Application", USENIX Association, Nov. 20–22, 1991, Monterey, California.

Joseph Boyken, et al., *Programming Under MACH*, Addison–Wesley Publishing Company, Incorporated, 1993.

Richard Rashid, "A Catalyst for Open Systems", *Datamation*, vol. 35, No. 10, pp. 32–33, May 15, 1989.

Allan Bricker et al., "Architectural Issues in Microkernal–based operating systems: the CHORUS Experience," *CHORUS*, vol. 14, No. 6, pp. 347–357, Jul./Aug. 1991.

Robbert van Renesse, et al., "Short Overview of Amoeba", USENIX Association, Apr. 27, 1992, Seattle, Washington.

James M. Phelan, et al., An OS/2 Personality on MACH, MACH II Symposium, USENIX Association, Apr. 19–21, 1993, Sante Fe, New Mexico.

Michel Gien, "Micro–Kernel Design" *UNIX Review*, vol. 8, No. 11, pp. 58–63.

Michel Gien, "Next Generation Operating Systems Architecture", Lecture Notes in Computer Science, Operating Systems of the 90s and Beyond–International Workshop, A. Karshmer, et al. Eds., Dagstuhl Castle, Germany, pp. 227–232, Jul. 8–12, 1991.

(List continued on next page.)

*Primary Examiner*—Tod R. Swann
*Assistant Examiner*—Christopher S. Chow
*Attorney, Agent, or Firm*—Mark Walker; Morgan & Finnegan, L.L.P.

[57] ABSTRACT

A personality operating system neutral pager manages the backing store of a microkernel data processing system, by interacting with any one of a variety of personality servers that provide a unique personality interface to a source of data for the system. By partitioning the backing storage management functions performed by the personality neutral pager from those personality unique functions performed by the personality servers, backing space can be flexibly managed in the memory of the microkernel system, independent of the eccentricities in the formats and interfaces imposed by diverse data sources such as magnetic disk drives, optical storage devices, distributed data processing networks, and telecommunications networks.

15 Claims, 6 Drawing Sheets

OTHER PUBLICATIONS

Mike Accetta, et al., "MACH: A New Kernel Foundation for UNIX Development", Proceedings of the Summer 1986 USENIX Conference, Atlanta, Georgia.

David Golub, et al., "UNIX as an Application Program", Proceedings of the Summer 1990 USENIX Conference, Anaheim, California.

David L. Black, et al., "Microkernel Operating System Architecture and MACH", USENIX Association, pp. 11–30, Apr. 27, 1992.

Kiczales, et al., "The Need for Customizable Operating Systems", Workstations Operating Systems, pp. 165–169, Jun. 1993.

Lea, Rodger et al., "COOL–2: an object oriented support platform built above the Chorus Micro–kernel", Object Orientation in Operating Systems, 1991 Int'L. Workshop, pp. 68–72, Feb. 1991.

Custer, Helen, "Inside Windows NT", Microsoft Press, pp. 194–198, 1993.

MEMORY OBJECT MANIPULATION 400

PAGING SPACE MANIPULATION 500

VIRTUAL MEMORY MANAGEMENT FOR A MICROKERNEL SYSTEM WITH MULTIPLE OPERATING SYSTEMS

FIELD OF THE INVENTION

The invention disclosed broadly relates to data processing systems and more particularly relates to improvements in operating systems for data processing systems.

RELATED PATENT APPLICATIONS

The invention disclosed herein is related to the copending United States Patent Application by Guy G. Sotomayor, Jr., James M. Magee, and Freeman L. Rawson, III, which is entitled "METHOD AND APPARATUS FOR MANAGEMENT OF MAPPED AND UNMAPPED REGIONS OF MEMORY IN A MICROKERNEL DATA PROCESSING SYSTEM", Ser. No. 08/263,710, filed Jun. 21, 1994, assigned to the International Business Machines Corporation, and incorporated herein by reference.

The invention disclosed herein is also related to the copending United States Patent Application by James M. Magee, et al. which is entitled "CAPABILITY ENGINE METHOD AND APPARATUS FOR A MICROKERNEL DATA PROCESSING SYSTEM", Ser. No. 08/263,313, filed Jun. 21,1994, assigned to the International Business Machines Corporation, and incorporated herein by reference, now FWC 08/851,267.

The invention disclosed herein is also related to the copending United States Patent Application by James M. Magee, et al. which is entitled "TEMPORARY DATA METHOD AND APPARATUS FOR A MICROKERNEL DATA PROCESSING SYSTEM", Ser. No. 08/263,633, filed Jun. 21, 1994, assigned to the International Business Machines Corporation, and incorporated herein by reference now U.S. Pat. No. 5,538,787.

The invention disclosed herein is also related to the copending United States Patent Application by James M. Magee, et al. which is entitled "MESSAGE CONTROL STRUCTURE REGISTRATION METHOD AND APPARATUS FOR A MICROKERNEL DATA PROCESSING SYSTEM", Ser. No. 08/263,703, filed Jun. 21, 1994, assigned to the International Business Machines Corporation, and incorporated herein by reference now FWC 08/851,535.

The invention disclosed herein is also related to the copending United States Patent Application by James M. Magee, et al. which is entitled "ANONYMOUS REPLY PORT METHOD AND APPARATUS FOR A MICROKERNEL DATA PROCESSING SYSTEM", Ser. No. 08/263, 709, filed Jun. 21, 1994, assigned to the International Business Machines Corporation, and incorporated herein by reference now FWC 08/585,541.

The invention disclosed herein is also related to the copending United States Patent Application by Aziza Bushra Faruqi, et al. which is entitled "SEPARATION OF TRANSMISSION CONTROL METHOD AND APPARATUS FOR A MICROKERNEL DATA PROCESSING SYSTEM", Ser. No. 08/303,805, filed Sep. 9, 1994, IBM Docket Number BC9-94081XX, assigned to the International Business Machines Corporation, and incorporated herein by reference.

The invention disclosed herein is also related to the copending United States Patent Application by Ram K. Gupta, Ravi Srinivasan, Dennis Ackerman, And Himanshu Desai which is entitled "EXCEPTION HANDING METHOD AND APPARATUS FOR A MICROKERNEL DATA PROCESSING SYSTEM", Ser. No. 08/303,796, filed Sep. 9, 1994, assigned to the International Business Machines Corporation, and incorporated herein by reference now U.S. Pat. No. 5,481,719.

The invention disclosed herein is also related to the copending United States Patent Application by Ram K. Gupta, Ravi Srinivasan, Dennis Ackerman, and Himanshu Desai which is entitled "EXCEPTION HANDLING METHOD AND APPARATUS FOR A MICROKERNEL DATA PROCESSING SYSTEM", Ser. No. 08/303,796filed Sep. 9, 1994, now U.S. Pat. No. 5,481,719, assigned to the International Business Machines Corporation, and incorporated herein by reference.

BACKGROUND OF THE INVENTION

The operating system is the most important software running on a computer. Every general purpose computer must have an operating system to run other programs. Operating systems typically perform basic tasks, such as recognizing input from the keyboard, sending output to the display screen, keeping track of files and directories on the disc, and controlling peripheral devices such as disc drives and printers. For more complex systems, the operating system has even greater responsibilities and powers. It makes sure that different programs and users running at the same time do not interfere with each other. The operating system is also typically responsible for security, ensuring that unauthorized users do not access the system.

Operating systems can be classified as single-user operating systems, multi-processor operating systems, multi-tasking operating systems, and real-time operating systems. A multi-user operating system allows two or more users to run programs at the same time. Some operating systems permit hundreds or even thousands of concurrent users. A multi-processing program allows a single user to run two or more programs at the same time. Each program being executed is called a process. Most multi-processing systems support more than one user. A multi-tasking system allows a single process to run more than one task. In common terminology, the terms multi-tasking and multi-processing are often used interchangeably even though they have slightly different meanings. Multi-tasking is the ability to execute more than one task at the same time, a task being a program. In multi-tasking, only one central processing unit is involved, but it switches from one program to another so quickly that it gives the appearance of executing all of the programs at the same time. There are two basic types of multi-tasking, preemptive and cooperative. In preemptive multi-tasking, the operating system parcels out CPU time slices to each program. In cooperative multi-tasking, each program can control the CPU for as long as it needs it. If a program is not using the CPU however, it can allow another program to use it temporarily. For example, the OS/2™ and UNIX™ operating systems use preemptive multi-tasking, whereas the Multi-Finder™ operating system for Macintosh™ computers uses cooperative multi-tasking. Multi-processing refers to a computer system's ability to support more than one process or program at the same time. Multi-processing operating systems enable several programs to run concurrently. Multi-processing systems are much more complicated than single-process systems because the operating system must allocate resources to competing processes in a reasonable manner. A real-time operating system responds to input instantaneously. General purpose operating systems such as DOS and UNIX are not real-time.

Operating systems provide a software platform on top of which application programs can run. The application programs must be specifically written to run on top of a particular operating system. The choice of the operating system therefore determines to a great extent the applications which can be run. For IBM compatible personal computers, example operating systems are DOS, OS/2™, AIX™, and XENIX™.

A user normally interacts with the operating system through a set of commands. For example, the DOS operating system contains commands such as COPY and RENAME for copying files and changing the names of files, respectively. The commands are accepted and executed by a part of the operating system called the command processor or command line interpreter.

There are many different operating systems for personal computers such as CP/M™, DOS, OS/2™, UNIX™, XENIX™, and AIX™. CP/M was one of the first operating systems for small computers. CP/M was initially used on a wide variety of personal computers, but it was eventually overshadowed by DOS. DOS runs on all IBM compatible personal computers and is a single user, single tasking operating system. OS/2, a successor to DOS, is a relatively powerful operating system that runs on IBM compatible personal computers that use the Intel 80286 or later microprocessor. OS/2 is generally compatible with DOS but contains many additional features, for example it is multitasking and supports virtual memory. UNIX and UNIX-based AIX run on a wide variety of personal computers and work stations. UNIX and AIX have become standard operating systems for work stations and are powerful multi-user, multi-processing operating systems.

In 1981 when the IBM personal computer was introduced in the United States, the DOS operating system occupied approximately 10 kilobytes of storage. Since that time, personal computers have become much more complex and require much larger operating systems. Today, for example, the OS/2 operating system for the IBM personal computers can occupy as much as 22 megabytes of storage. Personal computers become ever more complex and powerful as time goes by and it is apparent that the operating systems cannot continually increase in size and complexity without imposing a significant storage penalty on the storage devices associated with those systems.

It was because of this untenable growth rate in operating system size, that the MACH project was conducted at the Carnegie Mellon University in the 1980's. The goal of that research was to develop a new operating system that would allow computer programmers to exploit modern hardware architectures emerging and yet reduce the size and the number of features in the kernel operating system. The kernel is the part of an operating system that performs basic functions such as allocating hardware resources. In the case of the MACH kernel, five programming abstractions were established as the basic building blocks for the system. They were chosen as the minimum necessary to produce a useful system on top of which the typical complex operations could be built externally to the kernel. The Carnegie Mellon MACH kernel was reduced in size in its release 3.0, and is a fully functional operating system called the MACH microkernel. The MACH microkernel has the following primitives: the task, the thread, the port, the message, and the memory object.

The traditional UNIX process is divided into two separate components in the MACH microkernel. The first component is the task, which contains all of the resources for a group of cooperating entities. Examples of resources in a task are virtual memory and communications ports. A task is a passive collection of resources; it does not run on a processor.

The thread is the second component of the UNIX process, and is the active execution environment. Each task may support one or more concurrently executing computations called threads. For example, a multi-threaded program may use one thread to compute scientific calculations while another thread monitors the user interface. A MACH task may have many threads of execution, all running simultaneously. Much of the power of the MACH programming model comes from the fact that all threads in a task share the task's resources. For instance, they all have the same virtual memory (VM) address space. However, each thread in a task has its own private execution state. This state consists of a set of registers, such as general purpose registers, a stack pointer, a program counter, and a frame pointer.

A port is the communications channel through which threads communicate with each other. A port is a resource and is owned by a task. A thread gains access to a port by virtue of belonging to a task. Cooperating programs may allow threads from one task to gain access to ports in another task. An important feature is that they are location transparent. This capability facilitates the distribution of services over a network without program modification.

The message is used to enable threads in different tasks to communicate with each other. A message contains collections of data which are given classes or types. This data can range from program specific data such as numbers or strings to MACH related data such as transferring capabilities of a port from one task to another.

A memory object is an abstraction which supports the capability to perform traditional operating system functions in user level programs, a key feature of the MACH microkernel. For example, the MACH microkernel supports virtual memory paging policy in a user level program. Memory objects are an abstraction to support this capability.

All of these concepts are fundamental to the MACH microkernel programming model and are used in the kernel itself. These concepts and other features of the Carnegie Mellon University MACH microkernel are described in the book by Joseph Boykin, et al, "Programming Under MACH", Addison Wessely Publishing Company, Incorporated, 1993.

Additional discussions of the use of a microkernel to support a UNIX personality can be found in the article by Mike Accetta, et al, "MACH: A New Kernel Foundation for UNIX Development", Proceedings of the Summer 1986 USENIX Conference, Atlanta, Ga. Another technical article on the topic is by David Golub, et al, "UNIX as an Application Program", Proceedings of the Summer 1990 USENIX Conference, Anaheim, Calif.

The above cited, copending patent application by Guy G. Sotomayor, Jr., James M. Magee, and Freeman L. Rawson, III, describes the Microkernel System 115 shown in FIG. 1, which is a new foundation for operating systems. The Microkernel System 115 provides a concise set of kernel services implemented as a pure kernel and an extensive set of services for building operating system personalities implemented as a set of user-level servers. The Microkernel System 115 is made up of many server components that provide the various traditional operating system functions and that are manifested as operating system personalities. The Microkernel System 115 uses a client/server system structure in which tasks (clients) access services by making requests of other tasks (servers) through messages sent over a communication channel. Since the microkernel 120 provides very few services of its own (for example, it provides no file service), a microkernel 120 task must communicate with many other tasks that provide the required services.

Backing storage is the foundation copy of data stored in the memory, that is used as the source for creating data objects specified by the tasks and threads running in the system. The data in the backing storage must be immediately available when the virtual memory module calls for it. The source of the data written into the backing storage of the memory is any one of a variety of data storage or data networking devices. Data can be supplied from diverse supplied from diverse data sources such as magnetic disk drives, optical storage devices, distributed data processing networks, and telecommunications networks. Each of these media has eccentricities in the formats and interfaces they use. A wide variety of operating system interfaces have been provided in the prior art to match the characteristics of these various media. Each of the operating systems so provided, must also include backing storage managers that arrange the data in the memory so that it is accessible by the program entities requesting the data supplied from the media. This requirement that the operating system provide both the unique personality interface for interacting with the data source medium and also provide the backing storage management functions, creates undo complexity and rigidity in the prior art operating systems.

OBJECT OF THE INVENTION

It is therefore an object of the invention to provide improved efficiency in the operation of a backing store for a microkernel operating system.

It is another object of the invention to provide improved flexibility in the operation of a backing store in a microkernel architecture.

It is a further object of the invention to provide improved reliability for a backing store in a microkernel system.

It is a further object of the invention to provide backing space that can be flexibly managed in the memory of the microkernel.

It is a further object of the invention to provide a backing space manager that is independent of the eccentricities in the formats and interfaces imposed by diverse data sources.

It is a further object of the invention to provide a backing storage method that can flexibly interact with a variety of data sources such as magnetic disk drives, optical storage devices, distributed data processing networks, and telecommunications networks.

SUMMARY OF THE INVENTION

These and other objects, features and advantages are accomplished by the backing store management method and apparatus disclosed herein. The invention is a personality neutral pager that manages the backing store of a microkernel data processing system. The personality neutral pager interacts with any one of a variety of personality servers that provide a unique personality interface to a source of data for the system. By partitioning the backing storage management functions performed by the personality neutral pager from those personality unique functions performed by the personality servers, backing space can be flexibly managed in the memory of the microkernel system, independent of the eccentricities in the formats and interfaces imposed by diverse data sources such as magnetic disk drives, optical storage devices, distributed data processing networks, and telecommunications networks.

The data processing system in which the invention is applied, includes an auxiliary data source for storing data in an original format. This can be a bulk storage device, a data communications device, a volatile data storage device, a non-volatile data storage device, a magnetic data storage device, an optical data storage device, a writable random access memory, a programmable read only memory, a read only memory, a local area network, a distributed processing network, or a telecommunications network.

A memory in the data processing system is coupled to the auxiliary data source device, typically over a system bus for storing data structures and program instructions.

A personality server in the memory accesses the data in the auxiliary data source having the original format, and loads it into the memory. The personality server provides the external interface of a traditional operating system and has the personality of OS/2 or UNIX, or some other traditional operating system.

In accordance with the invention, a personality neutral pager is provided in the memory. It interacts with the personality server, for reformatting the data from the auxiliary data source into a backing storage format, for backing storage in the memory. The personality neutral pager forms the backing storage format for data in the memory by organizing the data into pages contained in frames, the frames being contained in paging spaces in the memory. The original format for data in the auxiliary data source includes data units of contiguous data. The personality neutral pager organizes the data units of contiguous data into a single frame of the pages.

The personality neutral pager receives requests for pages of data from the virtual memory module of the microkernel, running on the system's processor. The personality neutral pager maintains a threshold value for a minimum number of free pages desired to remain in the frames, that have not been requested by the virtual memory module. The personality neutral pager sends notification messages to the personality server-requesting additional data in the original format from the auxiliary data source, when the number of free pages is less than the threshold value. Alternately, the personality neutral pager sends notification messages to the personality server requesting additional frames to be allocated in the backing storage, when the number of free pages is less than the threshold value.

The personality neutral pager selectively performs a lazy deletion of pages of data from a first one of the frames by waiting to delete a first page therefrom until a second page is ready to replace the first page. Alternately, the personality neutral pager selectively performs an eager deletion of pages of data from a second one of the frames by deleting a first page therefrom before a second page is ready to replace the first page.

In this manner, backing space can be flexibly managed in the memory of the microkernel system, independent of the eccentricities in the formats and interfaces imposed by diverse data sources.

BRIEF DESCRIPTION OF THE DRAWING(S)

These and other objects features and advantages will be more fully appreciated with reference to the accompanying figures.

FIG. 1 is a functional block diagram of the Microkernel System 115 in the memory 102 of the host multiprocessor 100, showing how the microkernel 120 and personality-neutral services 140 run multiple operating system personalities on a variety of hardware platforms.

FIG. 2 is a functional block diagram of the Microkernel System 115 in the memory 102 paging data from an auxiliary storage, showing the separation of functions between the dominant personality management module 150 and the backing store management module 145 of the default pager 144.

DESCRIPTION OF THE ILLUSTRATIVE EMBODIMENT(S)

Part A. The Microkernel System
Section 1. Microkernel Principles

Figure 1:
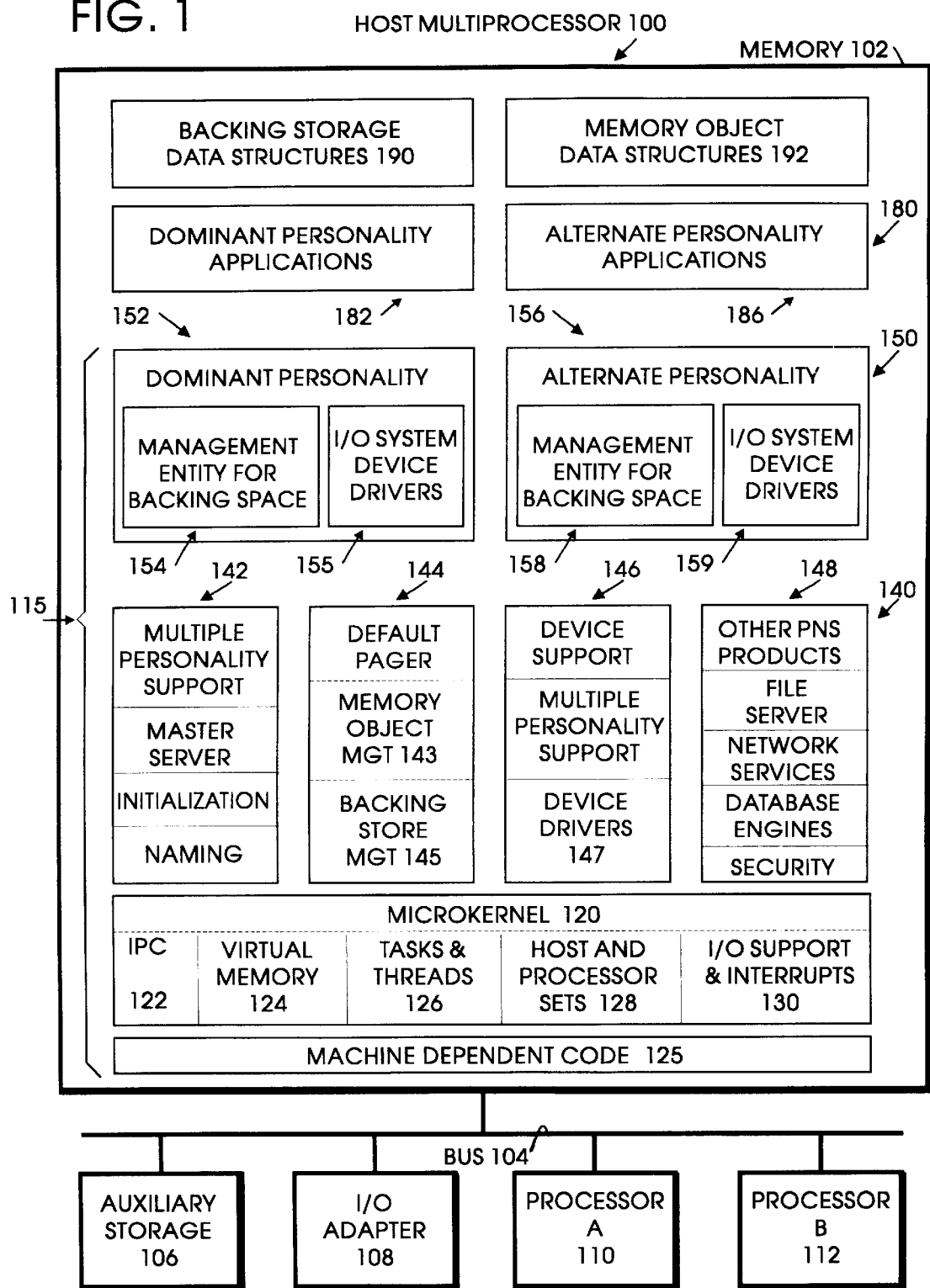

FIG. 1 is a functional block diagram of the Microkernel System 115, showing how the microkernel 120 and personality-neutral services 140 run multiple operating system personalities 150 on a variety of hardware platforms.

The host multi-processor 100 shown in FIG. 1 includes memory 102 connected by means of a bus 104 to an auxiliary storage 106 which can be for example a disc drive, a read only or a read/write optical storage, or any other bulk storage device.

The auxiliary storage 106 is an auxiliary data source for storing data in an original format. This can be a bulk storage device, a data communications device, a volatile data storage device, a non-volatile data storage device, a magnetic data storage device, an optical data storage device, a writable random access memory, a programmable read only memory, a read only memory, a local area network, a distributed processing network, or a telecommunications network. Also connected to the bus 104 is the I/O adaptor 108 which in turn may be connected to a keyboard, a monitor display, a telecommunications adaptor, a local area network adaptor, a modem, multi-media interface devices, or other I/O devices. Also connected to the bus 104 is a first processor A, 110 and a second processor B, 112. The example shown in FIG. 1 is of a symmetrical multi-processor configuration wherein the two uni-processors 110 and 112 share a common memory address space 102. Other configurations of single or multiple processors can be shown as equally suitable examples. The processors can be other types, for example, an Intel 386™ CPU, Intel 486™ CPU, a Pentium™ processor, or other uni-processor devices.

The memory 102 includes the microkernel system 115 stored therein, which comprises the microkernel 120, the machine dependent code 125, the personality neutral services (PNS) 140, and the personality servers 150. The microkernel system 115 serves as the operating system for the application programs 180 stored in the memory 102.

An objective of the invention is to provide an operating system that behaves like a traditional operating system such as UNIX or OS/2. In other words, the operating system will have the personality of OS/2 or UNIX, or some other traditional operating system.

The microkernel 120 contains a small, message-passing nucleus of system software running in the most privileged state of the host multi-processor 100, that controls the basic operation of the machine. The microkernel system 115 includes the microkernel 120 and a set of servers and device drivers that provide personality neutral services 140. As the name implies, the personality neutral servers and device drivers are not dependent on any personality such as UNIX or OS/2. They depend on the microkernel 120 and upon each other. The personality servers 150 use the message passing services of the microkernel 120 to communicate with the personality neutral services 140. For example, UNIX, OS/2 or any other personality server can send a message to a personality neutral disc driver and ask it to read a block of data from the disc. The disc driver reads the block and returns it in a message. The message system is optimized so that large amounts of data are transferred rapidly by manipulating pointers; the data itself is not copied.

By virtue of its size and ability to support standard programming services and features as application programs, the microkernel 120 is simpler than a standard operating system. The microkernel system 115 is broken down into modular pieces that are configured in a variety of ways, permitting larger systems to be built by adding pieces to the smaller ones. For example, each personality neutral server 140 is logically separate and can be configured in a variety of ways. Each server runs as an application program and can be debugged using application debuggers. Each server runs in a separate task and errors in the server are confined to that task.

FIG. 1 shows the microkernel 120 including the interprocess communications module (IPC) 122, the virtual memory module 124, tasks and threads module 126, the host and processor sets 128 I/O support and interrupts 130, and machine dependent code 125.

The personality neutral services 140 shown in FIG. 1 includes the multiple personality support 142 which includes the master server, initialization, and naming. It also includes the default pager 144 with the memory object management module 143 and the backing store management module 145. It also includes the device support 146 which includes multiple personality support and personality neutral device drivers 147. It also includes other personality neutral products 148, including a file server, network services, database engines and security.

The personality servers 150 are for example the dominant personality 152 which can be, for example, a UNIX personality. It includes a dominant personality server such as the management entity for backing space 154 which would be a UNIX server, and other dominant personality services such as the I/O system device drivers 155 which would support the UNIX dominant personality. An alternate dominant personality 156 can be for example OS/2. Included in the alternate personality 156 are the alternate personality server which would characterize the OS/2 personality such as the management entity for backing space 158, and other alternate personality services for OS/2, such as the I/O system device drivers 159.

Dominant personality applications 182 shown in FIG. 1, associated with the UNIX dominant personality example, are UNIX-type applications which would run on top of the UNIX operating system personality 152. The alternate personality applications 186 shown in FIG. 1, are OS/2 applications which run on top of the OS/2 alternate personality operating system 156. FIG. 1 also shows the backing storage data structures 190 and the memory object data structures 192 in the memory 102.

FIG. 1 shows that the Microkernel System 115 carefully splits its implementation into code that is completely portable from processor type to processor type and code that is dependent on the type of processor in the particular machine on which it is executing. It also segregates the code that depends on devices into device drivers; however, the device driver code, while device dependent, is not necessarily dependent on the processor architecture. Using multiple threads per task, it provides an application environment that permits the use of multi-processors without requiring that any particular machine be a multi-processor. On uni-processors, different threads run at different times. All of the support needed for multiple processors is concentrated into the small and simple microkernel 120.

The above cited patent applications provide a more detailed description of the Microkernel System 115, including the architectural model, tasks, threads, ports, and inter-process communications, and features of the microkernel 120. The virtual environment provided by the microkernel 120 consists of a virtual processor that executes all of the user space accessible hardware instructions, augmented by emulated instructions (system traps) provided by the kernel; the virtual processor accesses a set of virtualized registers and some virtual memory that otherwise responds as does the machine's physical memory. All other hardware resources are accessible only through special combinations of memory accesses and emulated instructions. Of course, it is a physical processor that actually executes the instructions represented by the threads.

Each physical processor that is capable of executing threads is named by a processor control port. Although significant in that they perform the real work, processors are not very significant in the microkernel, other than as members of a processor set. It is a processor set that forms the basis for the pool of processors used to schedule a set of threads, and that has scheduling attributes associated with it. The operations supported for processors include assignment to a processor set and machine control, such as start and stop.

Memory Management

The kernel provides some memory management. Memory is associated with tasks. Memory objects are the means by which tasks take control over memory management. The microkernel system 115 provides the mechanisms to support large, potentially sparse virtual address spaces. Each task has an associated address map that is maintained by the kernel and controls the translation of virtual address in the task's address space into physical addresses. As in virtual memory systems, the contents of the entire address space of any given task might not be completely resident in physical memory at the same time, and mechanisms must exist to use physical memory as a cache for the virtual address spaces of tasks. Unlike traditional virtual memory designs, the microkernel system 115 does not implement all of the caching itself. It gives user mode tasks the ability to participate in these mechanisms. The PNS include a user task, the default pager 144, that provides paging services for memory.

Unlike other resources in the microkernel system 115, virtual memory is not referenced using ports. Memory can be referenced only by using virtual addresses as indices into a particular task's address space. The memory and the associated address map that defines a task's address space can be partially shared with other tasks. A task can allocate new ranges of memory within its address space, de-allocate them, and change protections on them. It can also specify inheritance properties for the ranges. A new task is created by specifying an existing task as a base from which to construct the address space for the new task. The inheritance attribute of each range of the memory of the existing task determines whether the new task has that range defined and whether that range is virtually copied or shared with the existing task. Most virtual copy operations for memory are achieved through copy-on-write optimizations. A copy-on-write optimization is accomplished by protected sharing. The two tasks share the memory to be copied, but with read-only access. When either task attempts to modify a portion of the range, that portion is copied at that time. This lazy evaluation of memory copies is an important performance optimization performed by the microkernel system 115 and important to the communication/memory philosophy of the system.

Any given region of memory is backed by a memory object. A memory manager task provides the policy governing the relationship between the image of a set of pages while cached in memory (the physical memory contents of a memory region) and the image of that set of pages when not cached (the abstract memory object). The PNS default pager 144 is a memory manager that provides basic non-persistent memory objects that are zero-filled initially and paged against system paging space.

In resolving a page fault, the microkernel 120 may send a message to the default pager 144. The default pager 144 then reads in the page that the kernel needs from a hard disk. Although the page fault is usually being resolved on behalf of a user task, the kernel is the sender of the message.

The default pager 144 provides backing storage for anonymous memory (vm_allocate and copy memory, for example) It is the memory manager of last resort, one that cannot fail. Since no memory manager can provide paging for it, it is completely wired in memory, and all memory passed to it is wired, meaning that it cannot be evicted from the memory. This memory manager must promptly deal with its memory, and discard it when paged out to backing storage, because it is effectively wired.

Memory backed by the default pager 144 can be created in a variety of ways. These creations do not involve the default pager 144 directly. The kernel must inform the default pager 144 explicitly about new default memory objects. Privileged tasks might create a memory object to be managed by the default pager 144.

The default pager 144 provides backing storage for temporary memory objects created by the kernel to represent virtual copy ranges. These temporary objects have an additional operation applied to them. When a page from the original object is pushed onto them, the pushed data is supplied to the default pager 144. The kernel does not completely track the extent to which it pushes pages onto the copy. If the copy page is paged-out, a subsequent modification of the original object pushes the modified original page again. It is possible for the default pager 144 to receive more than one push message for a page. The manager must ignore all but the first of these.

The default pager 144 can be asked for a page of a copy that has never been pushed to it. The manager's response, is to copy the appropriate page from the original object.

High-level Invention Description

Default pager 144 uses backing space for storing the contents of the memory objects, it backs. It provides mechanism for dynamic addition and removal of backing space, depending on the load on the system. Dynamic addition and removal of backing paging space 404 is done independent of location and format backing space. Default pager 144 sends notification messages on path 198 to the management entity 154 in the system when certain thresholds are reached. The management entity 154 in the system can implement a policy depending on the environment to take a corrective action. In the earlier environment the system crashes if the backing space is fully used and there is an additional Page-Out request from the microkernel.

The functions collectively provide scalability and reliability features in the Default pager 144. They also provide location and format independent specification of backing storage to Default pager 144.

Technical Overview

Figure 3:
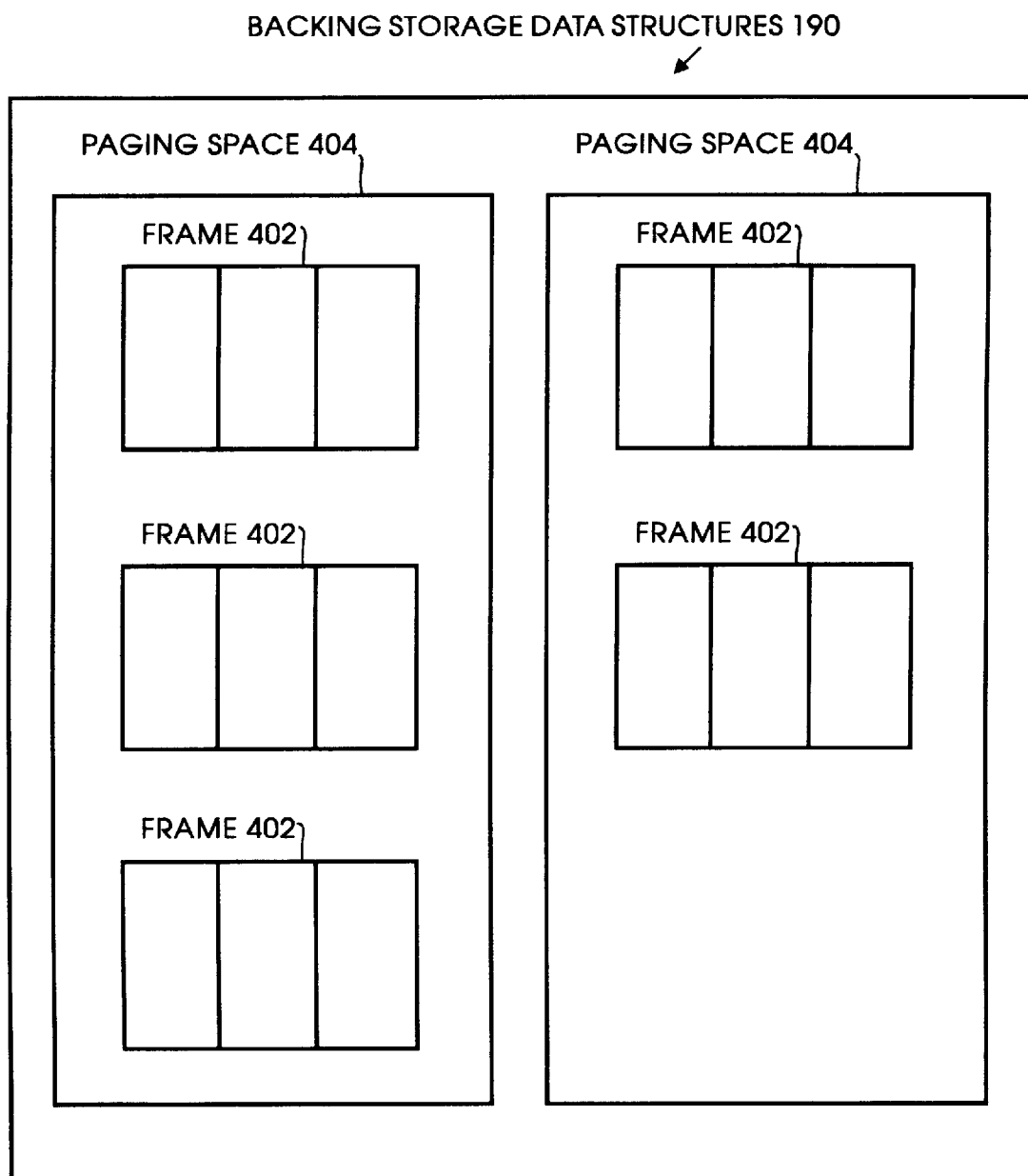
FIG. 3 illustrates an example layout of the backing store data structures 190.

PNS Default pager 144 Backing store 145 is organized in terms of Paging Spaces 404 and Frames 402, as shown in FIG. 3. Backing Storage consists of 0–N Paging spaces 404. Paging space 404 is the basic entry of managing paging regions. Default pager 144 maintains statistics on a per Paging space 404 basis. There can be 0–N frames 402 per Paging space 404. Frames 402 make up the storage of a Paging space 404. Frames 402 describe contiguous regions on a device. Non-contiguous regions on a device are represented by multiple Frames 402. Regions spanning multiple devices are also represented by multiple Frames 402.

1. Scalability Features

The Default pager 144 provides the following interfaces for the dynamic addition and deletion of backing storage regions. When a Paging space 404/Frame 402 is deleted, a notification message is sent to the management entity 154 in the system informing it that the Paging space 404/Frame 402 can be reclaimed.

1.1. Paging space 404 Related Interfaces

Creation of Paging space 404

This interface creates a new, separately managed, Paging space 404. A Paging space 404 is a logical region into which paging will be performed. A newly created paging space 404 has zero length. It has no frames 402 into which data can be paged. Frames 402 must be added to the Paging space 404, before it can be used to back memory objects.

Lazy Delete of Paging space 404

The Default pager 144 no longer actively pages to the specified Paging space 404. Thus the Paging space 404 is not used on Page-Out requests from the microkernel. Pages in the Paging space 404 that back memory objects are removed/moved only when Paged-In. Paging space 404 is reclaimed when there are no more pages residing in the Paging Space 404.

Eager Delete of Paging space 404

The Default pager 144 no longer actively pages to the specified Paging space 404. Thus the Paging space 404 is not used on Page-Out requests from the microkernel. Pages in the Paging space 404 that back memory objects are removed/moved to other Paging spaces 404 as soon as possible. To remove/move the pages to other paging spaces 404 the Default pager 144 does not merely depend on normal paging activity. Paging space 404 is reclaimed when there is no page residing in the Paging space 404.

1.2. Frame 402 Related Interfaces

Creation/Addition of a Frame 402

This interface creates and adds a Frame 402 to the specified Paging space 404. Frames 402 constitute the storage of a Paging space 404. This allows the size of a Paging space 404 to be increased dynamically.

Lazy Delete of Frame 402

The Default pager 144 no longer actively pages to the specified Frame 402. Thus the Frame 402 is not used on Page-Out requests from the microkernel. Pages in the Frame 402 are removed/moved only when Page-In occurs. Frame 402 is reclaimed when it is no longer backing any memory object.

Eager Delete of Frame 402

The Default pager 144 no longer actively pages to the specified Frame 402. Pages in the Frame 402 that back memory objects are removed/moved to other Frames 402 as soon as possible. To remove/move the pages to other Frames 402 the Default pager 144 does not merely depend on normal Paging activity. Frame 402 is reclaimed when it no longer backs any memory object.

2. Reliability Features

Each Paging space 404 is managed by the Default pager 144 as a separate entity. Default pager 144 provides interfaces to set the threshold values per Paging space 404. The management entity 154 in the system can set the Low Water mark and High Water mark for the number of free pages in each Paging space 404. When a threshold value is passed by any of the Paging spaces 404, a notification message is sent to the Management entity 154 for the backing space.

The management entity 154, upon receipt of threshold notification, can make an appropriate policy decision. The management entity 154 can allocate additional Paging space 404 or add Frames 402 to the Paging space 404 for which the Low Water mark notification is generated. The management entity 154 can also orderly deny the use of services.

Figure 2:
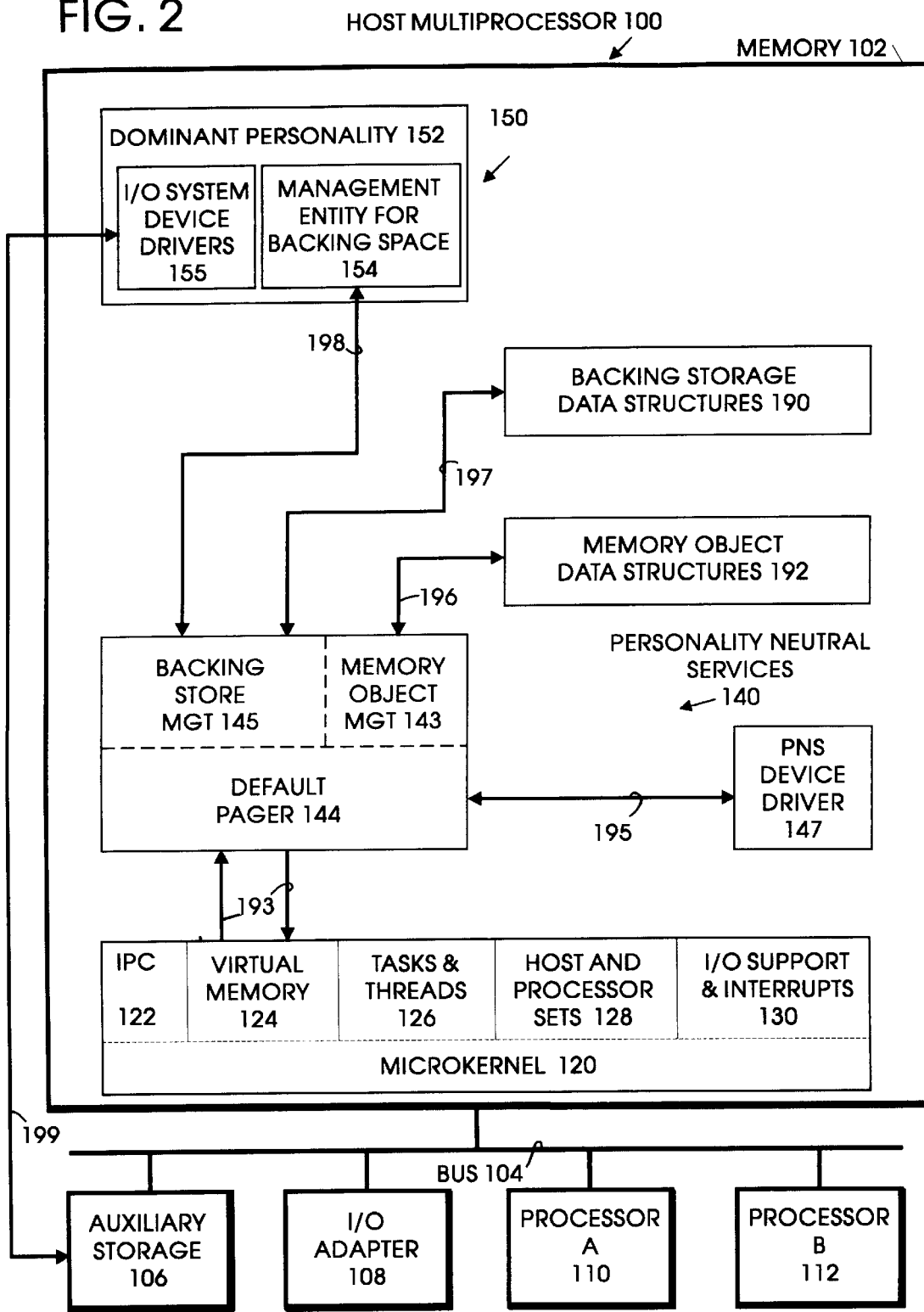

The FIG. 2 describes the interaction between the Default pager 144 and the management entity 154. FIG. 2 is a functional block diagram of the microkernel system 115 in the memory 102 paging data from an auxiliary storage, showing the separation of functions between the dominant personality management module 150 and the backing store management module 145 of the default pager 144. Virtual memory module 124 communicates with the default pager 144 over the path 193, requesting paging services for memory. The PNS device driver 147 communicates with the default pager 144 over the path 195 with interfaces for the driver 147 to perform operations to open, read, write, and close, files. Backing storage management module 145 communicates with the management entity for backing space 154 in the personality server 152, sending notification messages to the entity 154. Backing storage management module 145 receives messages from the management entity for backing space 154 to add paging space and other configuration messages. Backing storage management module 145 manages the backing store data structures 190 over path 197. The data structures 190, shown in FIG. 3, are organized into paging spaces 404 that contain frames 402, each frame containing pages of data. In this example, each page of data is 4 kbytes in size. Each page of a frame 404 corresponds to a page of data in the memory object data structures 192, the memory objects having been requested by the various tasks and threads executing in the host system 100, the request having been made through the agency of the virtual memory module 124. The default pager 144 forms each page of data in a frame 402 with a reference to the memory object data structure 192 that is backed by the page in the frame 402. The default pager 144 forms each page of data in a memory object data structure 192 with a reference to the paging space 404 and the frame 402 that contains the page of data backing the page in the memory object data structure 192. The memory object management module 143 manages the memory object data structures 192 over the path 196. The auxiliary storage 106 passes its data records to and from the I/O system device drivers 155 of the personality server 152, over the schematic path 199. Path 199 is schematic to represent the data path relationship of the storage 106 and the personality server 152, but the actual physical path is over the bus 104 to the memory 102.

3. Independence of Location and Format of Backing Storage

Frames 402 in the Default pager 144 describe regions of backing storage. A Frame 402 is passed to the Default pager 144 by the Management Entity 154 in the system, by using the Default pager 144 configuration interfaces. Frame 402 description provides independence of higher level media organization. The Default pager 144 is thus transparent to the File System Format and the Media Partition Format. Frame 402 description also provides independence of specific device type. The Default pager 144 is thus transparent to the device (Disk, Network).

Frame 402 description consists of the following:

The Paging space 404 to which the Frame 402 is to be added.

The device driver port for interacting with the device on which the backing storage lies. By passing a handle to the device driver, the Default pager 144 becomes independent of the specific device type.

Starting record on the device of the region to be added as backing storage. This field helps in providing independence of higher level media organization.

Number of contiguous records that constitute the region to be added as backing storage. This field helps in providing independence of higher level media organization.

Record size on the device. This field helps in providing independence of higher level media organization.

The Default pager 144 manages this frame 402 as a contiguous region and interacts with the device drivers through the standard Read/Write/Open/Close interfaces.

The FIG. 2 the describes the interaction between different entities due to which the Default pager 144 is independent of the location and format of backing storage.

Advantages

The PNS Default pager 144 allows not overcomitting the backing storage. The backing storage can be increased or decreased depending on the load on the system. Thus there is a better utilization of system resources.

The PNS Default pager 144 generates notification messages to the management entity 154 in the system when certain thresholds are reached. It thus allows the system to take corrective action based on a policy decision.

The PNS Default pager 144 is transparent to the addition of more personalities and devices. The backing space can be on different device types (i.e. DASD, writeable CD-ROM, Network, etc).

The implementation of Scalability feature in PNS Default pager 144 requires more wired memory as compared to the Default pager 144 in the earlier environment. The additional wired memory requirements are for supporting the dynamic removal of Paging spaces 404 and Frames 402.

Applications

This invention is useful in multi-user systems where system loads can vary dynamically. The system loads may vary because of the number of users on the system or because of varying system requirements of different personality applications. It is also useful on a system that supports different personality servers, in which case the PNS Default pager 144 remains transparent to the different file systems.

Default pager 144 uses backing space for storing the contents of the memory objects it backs. It provides a mechanism for dynamic addition and removal of backing space, depending on the load on the system. Dynamic addition and removal of backing paging space is done independent of location and format of backing space. Default pager 144 sends notification messages to the management entity 154 in the system when certain thresholds are reached. The management entity in the system can implement a policy depending on the environment to take a corrective action. In the earlier environment, the system crashes if the backing space is fully used and there is an additional Page-Out request from the microkernel 120.

These functions collectively provide scalability and reliability features in the Default Pager 144. They also provide location and format independent specification of backing storage to Default Pager.

This description contains the overall Default pager 144 Design, which includes the description of:

1) Memory Object Management
2) Backing Storage Management

The Backing Storage Management Invention divides the management of backing storage between the following two entities.

Personality
  The Personality will determine the regions to be used as Paging space 404 by the Default Pager. The personality Management Entity will interact with the Personality File Server to determine the regions on the various devices, which are to be supplied to the Default Pager, for backing the memory objects.

Default Pager
  The Default pager 144 will manage the regions (for backing memory objects supplied to it by the Personality. The Default pager 144 for reading/writing on the Paging space 404 will not interact with the Personality File Servers but will interact with Personality Neutral Device Drivers.

The division of the Backing Storage Management between the Personality Server and the Default pager 144 (Personality Neutral Server) is a novel feature of the invention.

The above division of the management of Backing Storage between the Personality and Default pager 144 is helpful because of the following reasons:

The Default pager 144 remains transparent to Personality specifics. It can support different Personality Servers 152 (OS/2, OSF, AIX etc).

Everything in the Default Pager Path should be wired/pinned down. By not interacting with the Personality File Servers the wired memory requirements are drastically reduced. It is no longer necessary to wire down part of Personality Servers.

HIGH LEVEL DESIGN

1. GENERAL OBJECTIVES

This section describes the architectural framework for Default pager 144 (hereinafter called DP) task. It describes in detail the functions of DP, the environment in which DP exists and its interfaces with Microkernel, system management entity 154, and other personality neutral (PN) servers.

DP is started by the Bootstrap Task. It is the very first task to be started after the Root Name Server Task.

2. USER REQUIREMENT

The Default pager 144 is required for memory to be overcommited. It is therefore loaded as early as possible in the boot sequence to allow memory to be overcommited. It will allow paging to areas on the boot device that are described by the Initial Paging space 404. The Initial Paging space 404 can be passed to the Default pager 144 by the bootstrap task. It can also be passed by a "Personality specific program" which does not require the Personality server 152 environment. The "Personality specific program" has Personality specific knowledge but is linked with Personality Neutral Libraries and interacts with Personality Neutral Device Drivers so that it can run without the Personality server 152 environment. This is helpful because the memory requirements of a "Personality Specific Program" (which initializes's the Default pager 144 with Paging space 404) is much less than that of a Personality server 152. This enables Paging earlier in the boot sequence and allows the system to be brought up with relatively small amounts of main memory.

Paging space 404 may also be supplied to the Default pager 144 by the Management entity 154 in the Personality server 152. If the Bootstrap task/"Personality Specific Program" does not supply the Paging space 404, there should be enough physical memory in the Paging space 404 by the Personality server 152. If Initial Paging space 404 is not passed to the Default Pager, the system will run without Paging being enabled till the point the Personality server 152 comes up and initializes the Default pager 144 with Paging space 404. Even when Initial Paging space 404 has been supplied to the Default Pager, additional Paging space 404 is usually supplied by the management entity 154 in the Personality server 152.

During system installation, there should be enough physical memory for the system to come up since the Default pager 144 would not have been initialized with the backing storage till the disk is formatted and partitions/filesystems created. The installation process should take care for setting up the disk for paging space 404 as early in the installation process as possible.

3. FUNCTIONAL SPECIFICATIONS

This section describes in detail the functional specifications of the Default Pager task.

3.1 OVERVIEW

The Default-Pager task is responsible for overcommitment of memory in the system. The Default Pager task never terminates itself. However, another task can register itself as the Default Pager. The earlier Default pager 144 will continue managing its memory objects. Any new memory objects that are created in the system will be managed by the new Default Pager.

The DP consists of the following two modules:

(1) Memory Object Management (2) Backing Storage Management

The functions of each of the two modules is described below (1) Memory Object Management Default-Pager manages internal memory objects. These are temporary memory objects created by the kernel. They represent anonymous memory (vm_allocate, vm_map, copy memory, out_of_line memory, etc).

Default-Pager also manages external memory objects. These are memory objects created by the default pager 144 on request of privileged tasks. These memory objects are useful as a shared memory. Tasks can use vm_map call to map this memory in their address space. Examples of where the external memory objects may be used are File Server shared memory (between interrupt handlers and device drivers)

Both internal and external memory objects provide non-permanent memory. The contents of the memory object do not persist after the memory object is destroyed.

The semantics provided by the Default pager 144 are:

The initial contents of the memory object is zero.

The contents of the memory object will not persist across system boots (non-permanent memory).

Only page aligned offsets in the memory object can be mapped in the address space of a task.

The contents of the memory objects are never modified by the Default Pager 144.

2) Backing Storage Management

The backing storage of the default pager 144 consists of multiple paging space 404, as is shown in FIG. 3. A paging space 404 is the basic entity for managing paging regions. Statistics are maintained on a per paging space 404 basis. Frames make up the storage of a paging space 404 and occupy a contiguous region on a device. All Paging space 404 and Frame 402 Space interfaces other then delete paging space 404 and remove frame 402 interfaces are synchronous. For the delete paging space 404 and remove frame 402 interfaces, the default pager 144 generates notify message when the delete operation is carried out. Both the page size on a host and the record size of a frame 402 should be a power of two and the page size should be a integer multiple of the record size.

The Default Pager 144 provides the following features:

Scalability

It supports dynamic addition and removal of paging space 404. The backing storage can be increased or decreased depending on the load on the system.

It is also possible to enable paging in the system before the personality server 152 (which gives the paging space 404 to default pager) comes up by supplying the paging space 404 on a floppy to the data structures 190. Once the Personality server 152 gives additional Paging space 404, the paging space 404 on the floppy can be deleted.

The interfaces for dynamic addition/deletion of backing storage regions are described below.

Reliability

The default pager 144 generates notification messages to another task when certain thresholds are reached and thus allows the system to take corrective action based on a policy decision.

Backing Storage consists of 0–N Paging space 404. Paging space 404 is the basic entity for managing paging regions. Frames make up the storage of a Paging space 404. Frames describe contiguous regions on a device. Non-contiguous regions are represented by multiple Frames. Regions spanning multiple devices are represented by multiple Frames.

Each Paging space 404 is managed as a separate entity. Default pager 144 supports interfaces to set the Threshold values per Paging space 404. Low Water Mark and High Water Mark values, to indicate the number of free pages, can be set for each Paging space 404.

When Threshold value is passed, by any of the paging spaces a notification message is sent to the Management entity 154 for the backing space.

The management entity 154 on reception of Threshold reached notification message can make an appropriate policy decision. The management entity 154 can allocate additional paging space 404, or add Frames to the Paging space 404 for which the Low Water mark notification message was generated. The management entity 154 can also orderly deny the use of services.

FIG. 2 shows interactions between different components.

Independence of location and format of backing space

It provides independence of higher level media organization.

It provides independence of specific device types.

The Default pager 144 is transparent to the addition of more personalities and devices. The backing space can be on different device types.

3.2 RUNTIME ENVIRONMENT

The Default Pager task links with PNS crt0.0 and with the standard PNS O Runtime libraries (libcint.a, libcext.a). It also links with following PNS libraries libns.a (Root Name server library)

libdd.a (Device Driver library)

3.3 OPERATION

Default pager 144 is a personality neutral service. It provides backing storage for anonymous memory. It is the memory manager of last resort. Since no memory manager can provide paging for it, its data writing path is completely wired in memory, and all memory passed to it is wired as well. All memory passed by the Default pager 144 to the device drivers is wired. Thus, the Device Drivers will never have a Page Fault when accessing the memory passed by the Default Pager. The memory manager promptly deals with its memory, and discards it when paged out to the backing storage since it is effectively wired.

The Default pager 144 is started by the Bootstrap task. The Default Pager task gets the following ports from the Bootstrap task as its "registered" ports.

Host Control Port

Master Device Port (if Microkernel is built with in-kernel device driver)

These ports are inserted in the Default Pager task by the Bootstrap task. The Default pager 144 retrieves these ports by the use of "mach_ports_lookup" call. The Default pager 144 accesses the Root Name Server port as an external variable (crt0 gets the Root Name Server port from the Bootstrap task and initializes the above variable).

The Default pager 144 does all initialization before registering with the Name Service. The default pager 144 will start threads for interacting with the micro-kernel/privileged suers, for managing internal memory objects, for managing external memory objects, for deleting Paging space 404/ Frame 402 operations and for Management Configuration interfaces. It will give appropriate privileges to the threads started by it.

The name that will be registered with the name service will be "Default-Pager". This is the name that privileged tasks will loop up in the Root Name server for creating external memory objects and get the default pager 144 information. The name that will be registered with the name service for the Configuration interfaces will be "MgtDefaultPager". This is the name that bootstrap task and the management entity 154 in the system will look up in the Root Name server. This port can be used to give Paging space 404 to the Default Pager. After registering with the Name Service the Default pager 144 starts receiving messages. Thus it is important for the Default pager 144 to do all initialization, before it registers with the Name Service. The default pager 144 establishes itself as the default memory manager for a host by informing the kernel of the default pager port. This is done after the Pager has been initialized with Paging space 404. The following function is used for establishing itself as the default-pager.

vm_set_default_memory_manager

The Initial Paging space 404 is provided to the Default pager 144 by the Bootstrap task or by the "personality specific program". The bootstrap task/"Personality specific program" uses the Default Pager Management Interfaces for providing the Paging space 404. The Default Pager Management Interface functions used by the bootstrap task/ "Personality specific program" for providing the paging space 404 are listed below.

DPAGER_Create_Paging_Space

DPAGER_Add_Space

It is not necessary for the Bootstrap task to provide the paging space 404. The Paging space 404 may be provided by the Personality when it comes up. Since the partitions are personality dependent, it is only the personality/"Personality Specific Program" that can find out the Paging space 404 for the Default Pager.

The Default pager 144 interacts with the Device Drivers for reading and writing to the Paging space 404. When In-Kernel device drivers 147 are used the device driver port is provided to the Default pager 144 by the "DPAGER_Add_Space" interface. When User-level device drivers 155 are used the device driver Public port is provided to the Default pager 144 by the "DPAGER_Add_Space" interface. The device driver Public port is checked in the name space. The system management entity 154 does a lookup in the name space and supplies the port to the Default pager 144 by the "DPAGER Add Space" interface. The Default pager 144 gets a private instance of the device driver port by using the "DD_Open" interface. The "DD_PAGER_PATH" bit of the flags parameter is set in the DD_Open interface call. This is used by the User-level device driver to wire down everything in the Default Pager path.

INTERFACES

This section describes the details of interfaces DP provides and/or uses with various components.

MEMORY OBJECT MANIPULATION

Figure 4:
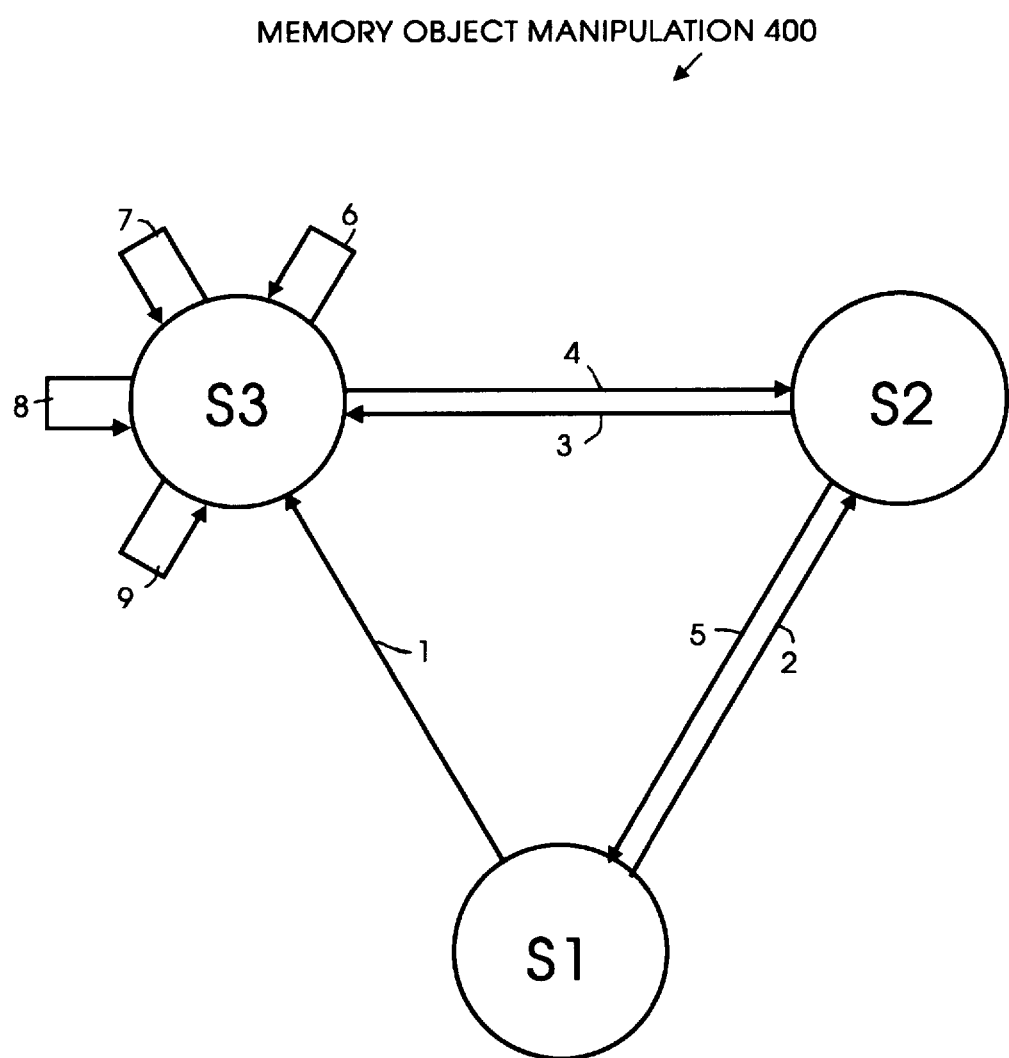
FIG. 4 is a state diagram of memory object manipulation 400 by the default pager 144.

The memory object manipulations are summarized in state diagram 400 of FIG. 4 and given in this section.

The states of the memory object are described below.

S1: Memory Object does not exist

S2: Memory Object exists but does not know the Cache Control Port by which it can send messages to kernel.

S3: Memory Object exists and knows the cache control port.

The transitions in the various states are described below. Unless stated all the interfaces are asynchronous.

1: memory_object_create message is received

A kernel created memory object is passed to the default-pager. The Default-Pager does initialization for the memory object and stores it on the hash list of memory objects.

2: default_pager_object_create message is received

This message is received when privileged tasks request the Default pager 144 to create a memory object which can be used in vm_map call. This is a synchronous interface. The Default-Pager does initialization for the memory object and stores it on the hash list of memory objects. It returns a send right of the memory object created to the requesting task.

3: memory_object_notify message is received

Kernel sends this message when a task vm_maps a memory object port which had been previously created by default_pager_object_create interface. The Default-Pager stores the Cache Control Port supplied by the kernel and informs the kernel that it is ready to receive messages for this memory object. It informs the kernel by memory_object_establish/ memory_object_representative call.

4: memory_object_terminate message is received

On receipt of this message the default pager 144 waits for all preceding read and writes to be completed. It then destroys the send right of the cache control port. The memory object still exists but is not mapped in the address space of any task. The pages of the memory object are maintained on the backing storage. In this state it can receive either of the following messages.

memory_object_notify no_sender_notification message

5: no_sender_notification message is received

This message is received when no task has a send right for the memory object. The default pager 144 frees the pages of the memory object on the backing storage. It then destroys the memory object.

6: memory_object_data_request message is received

If the default pager 144 does not have a copy of the page (it was never Paged-Out) it supplies a zero filled page. Otherwise if clean-in-place mechanism is not being used it waits for all preceding writes to be over before fetching the page from the backing storage. This is done so that a stale page does not get fetched when a Page-In request follows a Page-Out request. If clean-in-place mechanism is being used the page is fetched from backing storage and given to the kernel.

7: memory_object_data_write message is received

This is a Page-Out request and is immediately processed. The pages are stored on the backing storage. If clean-in-place mechanism is being used the kernel is informed that the pages have been disposed.

8: memory_object_data initialize message is received

This is a Page-Out request. If this is the first Page-out request by the kernel for this page, the page is stored on the backing storage. Otherwise this Page-Out request is ignored.

This is done because kernel creates temporary memory objects to represent virtual copy ranges. Initially both the old and new memory object share pages in the memory. When a page from the old object is to be modified, the kernel pushes the un-modified value of the page onto the new object. The kernel does not completely track the extent to which it pushes pages onto the copy. Since it is possible for the Default pager 144 to receive more then one push messages, the manager must ignore all but the first of these.

9: memory_object_synchronize

This message is received because of a clients wish to synchronize the contents of a range of memory object with its backing storage.

Paging space 404 MANIPULATION

Figure 5:
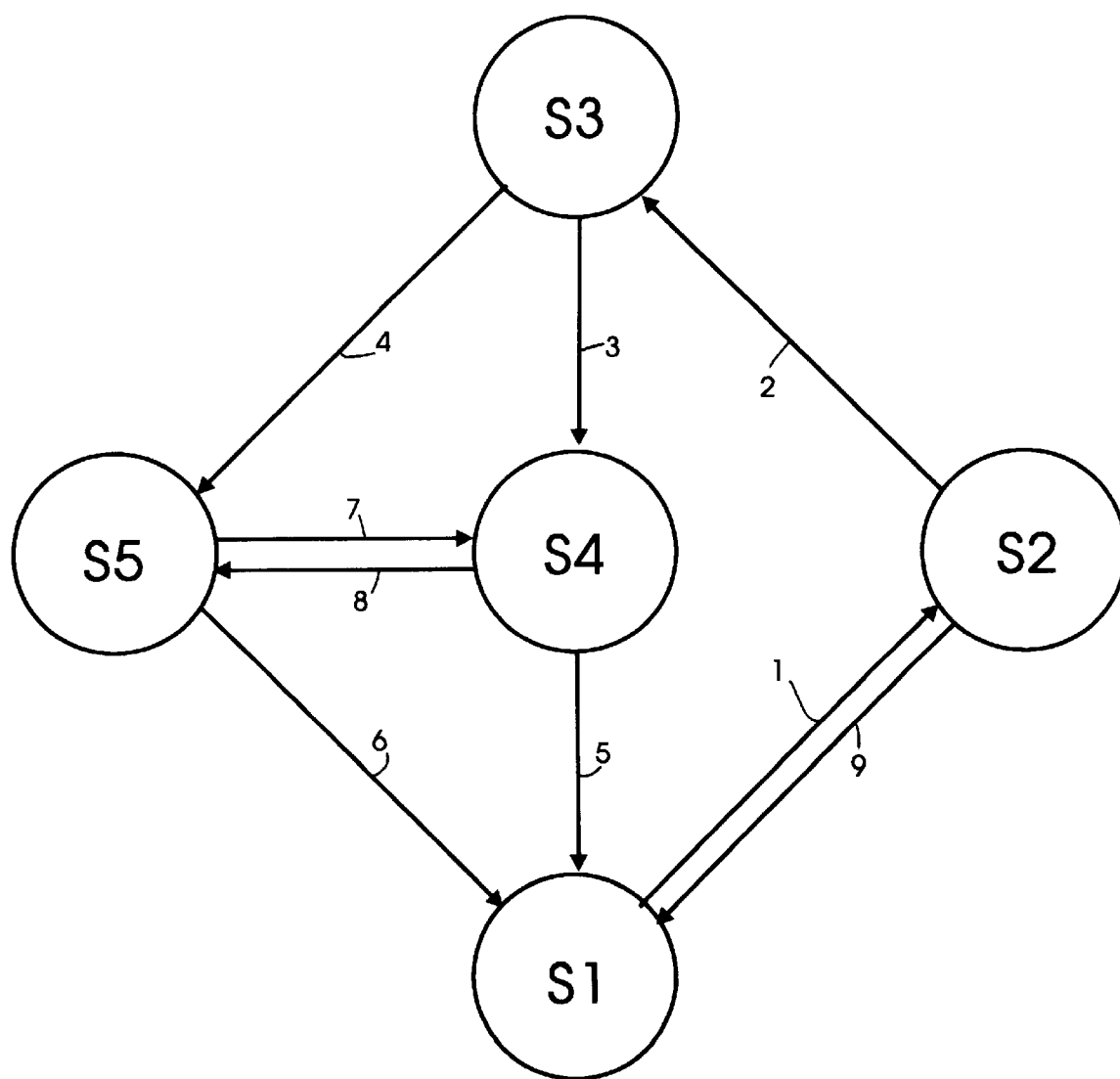
FIG. 5 is a state diagram of paging space manipulation 500 by the default pager 144.

The operations that can be performed on the Paging space 404, shown in the state diagram 500 of FIG. 5, are create a paging space 404 This creates a new separately managed paging space 404.

delete a paging space 404 This interface removes a paging space 404 from the default pager.

If it is a Lazy delete the pages in a paging space 404 are removed only when Paged-In and new pages are not written to the frame 402.

If it is a Eager delete the pages in a paging space 404 are removed as quickly as possible.

list paging space 404 This interface enumerates all paging space 404 in the default pager.

get statistics on a paging space 404

The statistics supported are number of Page-In requests for pages in this paging space 404.

number of Page-Out requests for pages in this paging space 404.

set notification threshold for a paging space 404

It allows other tasks to be informed of events in the pager. The events notified are:

Threshold Reached,

Paging space 404 freed,

Frame 402 freed.

The paging space 404 manipulations are summarized in the FIG. 4 given in this section. When Eager delete paging space 404 request is received and the Eager delete thread starts processing the delete request the paging space 404 is deleted by the thread managing Eager delete requests. If the Eager delete thread has not started processing the request the paging space 404 is deleted by the thread processing the last Page-In for a page in this paging space 404 or processing a terminate of a memory object that frees up all pages in this paging space 404. When Lazy delete paging space 404 is received the paging space 404 is deleted by the thread processing the last Page-In request for a page in this paging space 404 or processing a terminate of a memory object that frees up all pages in this paging space 404.

The states of the paging space 404 are described below.

S1: The paging space 404 does not exist.

S2: The paging space 404 exists but does not contain any storage (frames).

S3: The paging space 404 exists and contains storage (frames). The paging space 404 is used for both Page-In and Page-Out requests.

S4: The paging space 404 is marked for Lazy delete. It is used only for Page-In requests.

S5: The paging space 404 is marked for Eager delete. It is used only for Page-In requests.

The transitions in the various states are described below.

1: DPAGER_Create_Paging_Space message is received. This creates a new paging space 404.

2: The first DPAGER_Add_Space message is received for this paging space 404.

3: DPAGER_Delete_Paging_Space message is received. It is a Lazy delete request.

4: DPAGER_Delete_Paging_Space message is received. It is a Eager delete request.

5: Paging space 404 is deleted and dpager_Notify_Paging_Space_Freed message is issued.

6: Paging space 404 is deleted and dpager_Notify_Paging_Space_Freed message is issued.

7: All frames in the paging space 404 which were marked for Eager delete or were in active state have been deleted. But the paging space 404 is not empty since there are frames in the paging space 404 that are marked for Lazy delete. The state of the paging space 404 is changed so that it will not be deleted by the thread managing Eager delete requests. The paging space 404 will be deleted by the thread that processes the last Page-In request for this paging space 404.

8: All frames in the paging space 404 which were marked for Lazy delete or were in the active state have been deleted. But the paging space 404 is not empty since there are frames in the paging space 404 that are marked for Eager delete. The state of the paging space 404 is changed so that it will be deleted by the thread managing Eager delete requests.

9: DPAGER_Remove_Space message is received. This transition occurs only after this message has been completely processed and if it results in no frames in the paging space 404.

Frame 402 MANIPULATION

Figure 6:
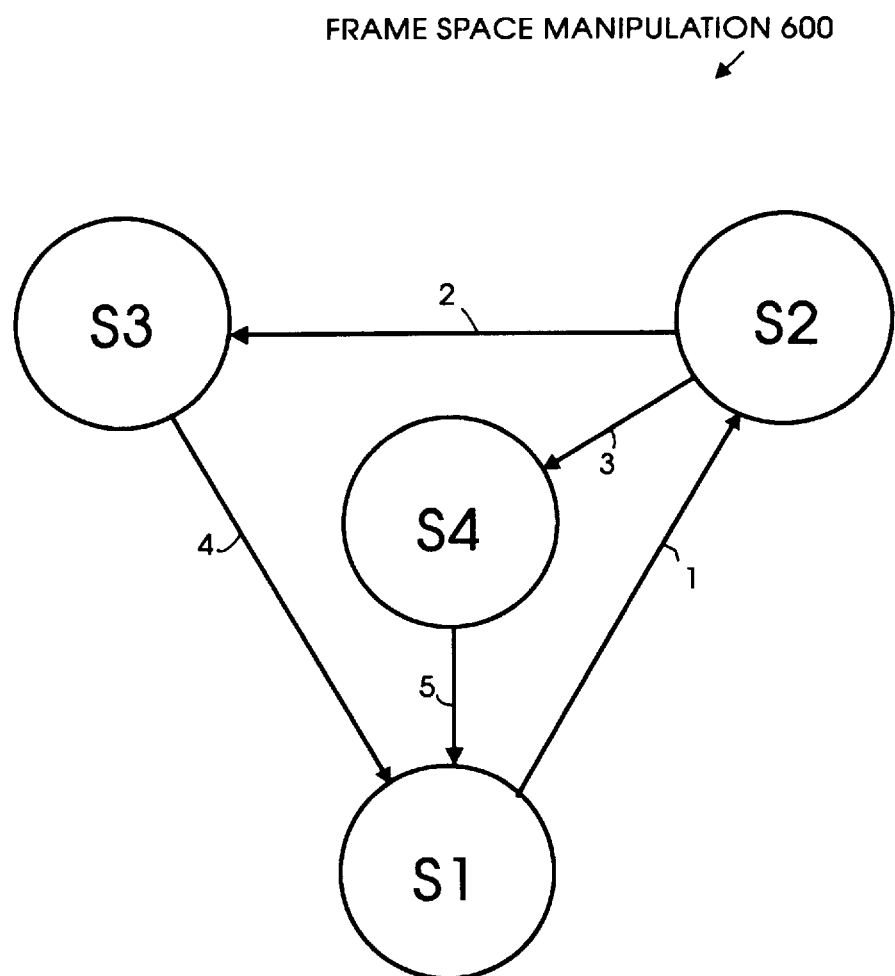
FIG. 6 is a state diagram of frame space manipulation 600 by the default pager 144.

The operations that can be performed on the frame 402 are described in the state diagram 600 of FIG. 6, and are as follows:

add a new frame 402

Adds a new frame 402 to a paging space 404.

remove a frame 402

This interface removes a frame 402 from a paging space 404.

If it is a Lazy delete the pages in a frame 402 are removed only when Paged-In and new pages are not written to the frame 402.

If it is a Eager delete the pages in a frame 402 are removed as quickly as possible.

list a frame 402

This interface enumerates the frames in the paging space 404.

The frame 402 manipulations are summarized in the FIG. 5 given in this section. When Eager Frame 402 delete request is received and the Eager Delete thread starts processing the delete frame 402 request, the frame 402 is deleted by the thread managing the delete Eager requests. If the Eager delete thread has not started processing the request the paging space 404 is deleted by the thread processing the last Page-In for a page in this frame 402 or processing a terminate of a memory object that frees up all pages in this frame 402. When Lazy frame 402 delete request is received, the frame 402 is deleted by the thread which processes the last Page-In request for the frame 402 or processes the terminate of a memory object that frees up all pages in this frame 402.

The states of the frame 402 are described below.

S1: Frame 402 does not exist

S2: Frame 402 is in active state. It is used for both Page-In and Page-Out requests.

S3: Frame 402 is marked for Lazy delete. It is used only for Page-In requests.

S4: Frame 402 is marked for Eager delete. It is used only for Page-In requests.

The transitions in the various states are described below.

1: DPAGER_Add_Space message is received.

2: DPAGER_Remove_Space message is received. It is a Lazy delete request.

3: DAPGER_Remove_Space message is received. It is a Eager delete request.

4: Frame 402 is deleted and dpager_Notify_Space_Freed message is issued.

5: Frame 402 is deleted and dpager_Notify_Space_Freed message is issued.

The resulting backing store management method and apparatus invention provides improved efficiency, flexibility, and reliability in the operation of a microkernel operating system.

Although a specific embodiment of the invention has been disclosed, it will be understood by those having skill in the art that changes can be made to that specific embodiment without departing from the spirit and scope of the invention.

What is claimed is:

1. In a data processing system a memory management apparatus, comprising:

an auxiliary data source means in the data processing system, for storing data in original format;

a bus means coupled to said auxiliary data source means;

a memory means in the data processing system coupled to said auxiliary data source device over said bus means, for storing data structures and program instructions;

a processor means coupled to the memory means and to the auxiliary data source device over the bus means, for executing said program instructions stored in said memory means;

a personality server in said memory means, coupled to said auxiliary data source means, for using a unique operating system personality accessing method to access said data in said auxiliary data source means having said original format, and loading it into said memory means;

a personality neutral pager means in said memory, coupled to said personality server, for reformatting said data into a backing storage format, for operating system personality neutral backing storage in said memory means;

said personality neutral pager means forming said backing storage format for data in said memory by organizing said data into pages contained in frames, said frames being contained in paging spaces in said memory means;

said original format for data in said auxiliary data source means including data units of contiguous data;

said personality neutral pager means organizing said data units of contiguous data into a single frame of said pages.

2. The memory management apparatus of claim 1, which further comprises:

said personality neutral pager means receiving requests for pages of data from said processor means;

said personality neutral pager means maintaining a threshold value for a minimum number of free pages desired to remain in said frames, that have not been requested by said processor means;

said personality neutral pager means sending notification messages to said personality server requesting additional data in said original format from said auxiliary data source means, when said number of free pages is greater than said threshold value.

3. The memory management apparatus of claim 1, which further comprises:

said personality neutral pager means receiving requests for pages of data from said processor means;

said personality neutral pager means maintaining a threshold value for the minimum number of free pages desired to remain in said frames, that have not been requested by said processor means;

said personality neutral pager means sending notification messages to said personality server requesting additional frames to be allocated in said backing storage, when said number of free pages is less than said threshold value.

4. The memory management apparatus of claim 1, which further comprises:

said personality neutral pager means selectively performing a lazy deletion of pages of data from a first one of said frames by waiting to delete a first page therefrom until a second page is ready to replace the first page.

5. The memory management apparatus of claim 1, which further comprises:

said personality neutral pager means selectively performing an eager deletion of pages of data from a second one of said frames by deleting a first page therefrom before a second page is ready to replace the first page.

6. The memory management apparatus of claim 1, wherein:

said auxiliary data source means is a member of the group consisting of a bulk storage device, a data communications device, a volatile data storage device, a non-volatile data storage device, a magnetic data storage device, an optical data storage device, a writeable random access memory, a programmable read only memory, a read only memory, a local area network, a distributed processing network, and a telecommunications network.

7. In a data processing system including an auxiliary data source means for storing data in an original format, a memory means for storing data structures, a memory management method, comprising:

using a unique operating system personality accessing method to access data in said auxiliary data source means having said original format and load it into said memory means;

forming a backing storage format for data in said memory with an operating system personality neutral pager means by organizing said data into pages contained in frames, said frames being contained in paging spaces in said memory means;

said original format for data in said auxiliary data source means including data units of contiguous data;

organizing said data units of contiguous data into a single frame of said pages with said personality neutral pager means;

said personality neutral pager means receiving requests for pages of data from a processor means;

maintaining a threshold value for a minimum number of free pages desired to remain in said frames, that have not been requested by said processor means, with said personality neutral pager means;

sending notification messages from said personality neutral pager means to said personality server requesting additional data in said original format from said auxiliary data source means, when said number of free pages is greater than said threshold value.

8. The memory management method of claim 7, wherein:

said personality neutral pager means receiving requests for pages of data from said processor means;

maintaining a threshold value for the minimum number of free pages desired to remain in said frames, that have not been requested by said processor means, with said personality neutral pager means; and sending notification messages from said personality neutral pager means to said personality server requesting additional frames to be allocated in said backing storage, when said number of free pages is less than said threshold value.

9. The memory management method of claim 7, wherein:

selectively performing with said personality neutral pager means, a lazy deletion of pages of data from a first one of said frames by waiting to delete a first page therefrom until a second page is ready to replace the first page.

10. The memory management method of claim 7, wherein:

selectively performing with said personality neutral pager means, an eager deletion of pages of data from a second one of said frames by deleting a first page therefrom before a second page is ready to replace the first page.

11. An article of manufacture for use in a data processing system including an auxiliary data source means for storing data in an original format and a memory means for storing data structures, comprising:

a computer useable medium having computer readable program code means embodied therein for providing a memory management method, the computer readable program code means in said article of manufacture comprising:

computer readable program code means for causing a computer to access data using a unique operating system personality accessing method, said data accessed from said auxiliary data source means having said original format and load it into said memory means;

computer readable program code means for causing the computer to form a backing storage format for data in said memory with an operating system personality neutral pager means by organizing said data into pages contained in frames, said frames being contained in paging spaces in said memory means;

said original format for data in said auxiliary data source means including data units of contiguous data;

computer readable program code means for causing the computer to organize said data units of contiguous data into a single frame of said pages with said personality neutral pager means.

12. The article of manufacture for use in the computer system of claim 11, which further comprises:

said personality neutral pager means receiving requests for pages of data from said processor means;

computer readable program code means for causing the computer to maintain a threshold value for a minimum number of free pages desired to remain in said frames, that have not been requested by said processor means, with said personality neutral pager means;

computer readable program code means for causing the computer to send notification messages from said personality neutral pager means to said personality server requesting additional data in said original format from said auxiliary data source means, when said number of free pages is greater than said threshold value.

13. The article of manufacture for use in the computer system of claim 11, which further comprises:

said personality neutral pager means receiving requests for pages of data from said processor means;

computer readable program code means for causing the computer to maintain a threshold value for the minimum number of free pages desired to remain in said frames, that have not been requested by said processor means, with said personality neutral pager means;

computer readable program code means for causing the computer to send notification messages from said personality neutral pager means to said personality server requesting additional frames to be allocated in said backing storage, when said number of free pages is less than said threshold value.

14. The article of manufacture for use in the computer system of claim 11, which further comprises:

computer readable program code means for causing the computer to perform selectively with said personality neutral pager means, a lazy deletion of pages of data from a first one of said frames by waiting to delete a first page therefrom until a second page is ready to replace the first page.

15. The article of manufacture for use in the computer system of claim 11, which further comprises:

computer readable program code means for causing the computer to perform selectively with said personality neutral pager means, an eager deletion of pages of data from a second one of said frames by deleting a first page therefrom before a second page is ready to replace the first page.

* * * * *